United States Patent [19]

Gross et al.

[11] Patent Number: 5,302,974
[45] Date of Patent: Apr. 12, 1994

[54] DRUM PLOTTER

[75] Inventors: Abraham Gross, Rehovot; Itzhak Taff, Ness Ziona, both of Israel

[73] Assignee: Optrotech Ltd., Ness Ziona, Israel

[21] Appl. No.: 816,804

[22] Filed: Jan. 3, 1992

[51] Int. Cl.⁵ .......................... G01D 15/14
[52] U.S. Cl. ...................... 346/108; 346/160
[58] Field of Search ............ 346/108, 107 R, 160, 346/762

[56] References Cited

U.S. PATENT DOCUMENTS

| | | | |
|---|---|---|---|
| 4,107,687 | 8/1978 | Pfeifer et al. | 346/107 R |
| 4,209,239 | 6/1980 | K. O. Wood et al. | 346/108 X |
| 4,211,838 | 7/1980 | Izu et al. | 430/502 |
| 4,376,282 | 3/1983 | Kotani et al. | 346/107 R |
| 4,520,472 | 5/1985 | Reno | 369/112 |
| 4,524,372 | 6/1985 | De Cock et al. | 346/160 |
| 4,661,828 | 4/1987 | Miller, Jr. et al. | 346/108 |
| 4,672,258 | 6/1987 | Konishi | 346/108 X |
| 4,743,091 | 5/1988 | Gelbart | 350/252 |
| 4,918,465 | 4/1990 | Morita | 346/108 |
| 4,978,974 | 12/1990 | Etzel | 346/107 R |
| 5,016,027 | 5/1991 | Uebbing | 346/107 R |
| 5,032,848 | 7/1991 | Morita | 346/108 X |

FOREIGN PATENT DOCUMENTS 393,291 10/1990 Europe .

*Primary Examiner*—H. L. Moses
*Assistant Examiner*—Nestor R. Ramirez
*Attorney, Agent, or Firm*—Darby & Darby

[57] ABSTRACT

An external drum plotter including a generally cylindrical drum having a longitudinal axis of symmetry and a cylindrical support surface disposed about the longitudinal axis, for supporting thereon in generally cylindrical configuration, recording material to be written upon, apparatus for rotating the drum about the longitudinal axis, longitudinal track apparatus arranged parallel to the longitudinal axis; mounting apparatus arranged for longitudinal riding movement on the track apparatus and parallel to the longitudinal axis and a multiplicity of laser diode writing assemblies mounted on the track apparatus and arranged for writing engagement with the recording material while the recording material rotates and the mounting apparatus moves longitudinally parallel to the longitudinal axis.

11 Claims, 3 Drawing Sheets

DRUM PLOTTER

FIELD OF THE INVENTION

The present invention relates to plotters generally and more particularly to drum plotters for writing on direct write materials.

BACKGROUND OF THE INVENTION

There exist a wide variety of drum plotters, including generally speaking drum plotters wherein the source of writing energy is internal to or external of recording material to be written upon, which is maintained in a generally cylindrical configuration, during writing.

In recent years direct write recording materials have been developed for use in plotters. These materials are distinguished from conventional recording materials in that they do not require photographic development. These materials do have the disadvantage that they require relatively high input energy levels for writing thereupon.

The disclosures of the following prior art patents are hereby incorporated by reference.

U.S. Pat. No. 4,211,838 describes a method of high sensitivity imaging and imaging film therefor. Reference is made particularly to the patents and patent applications mentioned at column 1, lines 1-30.

U.S. Pat. No. 4,743,091 describes a two-dimensional laser diode array in which the laser diodes are arranged in a staggered pattern.

U.S. Pat. No. 4,978,974 describes an image recorder with a linear laser diode array which is mounted to project the output of the diodes onto a thermally activated photosensitive material.

U.S. Pat. No. 4,520,472 describes beam expansion and relay optics for a laser diode array.

SUMMARY OF THE INVENTION

The present invention seeks to provide an external drum plotter which is particularly suitable for relatively high resolution, high energy, writing on direct write recording media.

There is thus provided in accordance with a preferred embodiment of the present invention an external drum plotter including a generally cylindrical drum having a longitudinal axis of symmetry and a cylindrical support surface disposed about the longitudinal axis, for supporting thereon in generally cylindrical configuration, recording material to be written upon, apparatus for rotating the drum about the longitudinal axis, longitudinal track apparatus arranged parallel to the longitudinal axis; mounting apparatus arranged for longitudinal riding movement on the track apparatus and parallel to the longitudinal axis and a multiplicity of laser diode writing assemblies mounted on mounting apparatus and arranged for writing engagement with the recording material while the recording material rotates and the mounting apparatus moves longitudinally parallel to the longitudinal axis.

In accordance with a preferred embodiment of the present invention, the multiplicity of laser diode writing assemblies is arranged for impingement on the recording material in a line configuration.

Additionally in accordance with a preferred embodiment of the invention reading apparatus is mounted on the mounting apparatus for motion therewith relative to the recording material for providing verification of correct writing by the multiplicity of laser diode writing assemblies.

In accordance with an embodiment of the invention, the resolution of writing on the recording medium can be selected by selecting the angle of the line configuration of impingement relative to the longitudinal axis. Additionally in accordance with a preferred embodiment of the invention, enhancement of resolution may be achieved by interlacing.

Further in accordance with a preferred embodiment of the present invention, the multiplicity of laser diode writing assemblies may be arranged in mutually offset pairs, each pair including a laser diode writing assembly which is oppositely inclined with respect to the other relative to the longitudinal axis so that they both impinge along the same line.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 5:
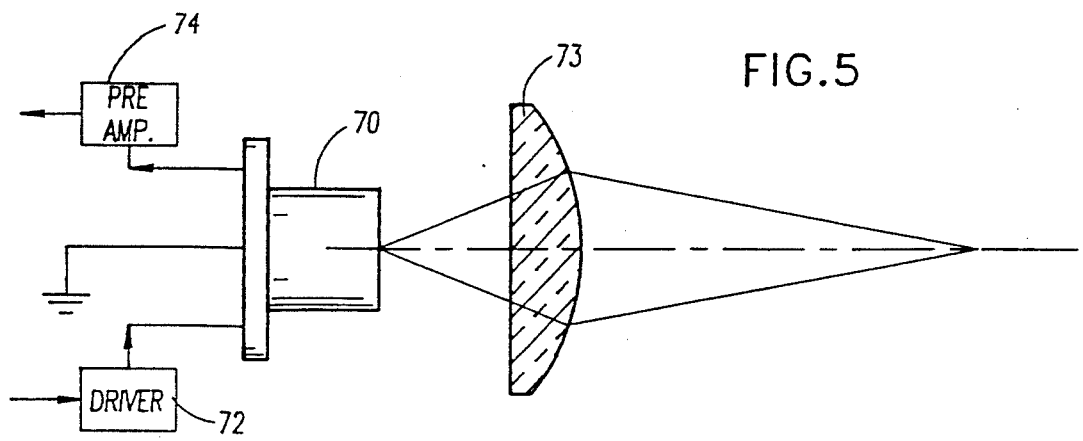
FIG. 5 is a partially block diagram, partially pictorial illustration of a laser diode writing assembly useful in the present invention.

Reference is now made to FIGS. 1-5, which illustrate an external drum plotter constructed and operative in accordance with a preferred embodiment of the present invention and including a generally cylindrical drum 10 having a longitudinal axis of symmetry 12 and a cylindrical support surface 14 disposed about the longitudinal axis, for supporting thereon in generally cylindrical configuration, recording material 16 to be written upon. A preferred recording material is a direct write recording material such as described in U.S. Pat. No. 4,211,838, the disclosure of which is hereby incorporated by reference, although the invention is not limited to the use of such direct write materials.

In accordance with a preferred embodiment of the present invention, the cylindrical support surface 14 of drum 10 is formed with a multiplicity of suction apertures 18 which communicate via conduits (not shown) internal to drum 10 and via a vacuum conduit 20 to a source of relatively negative pressure (not shown). This construction, which is known in the art, enables vacuum retention of the recording material 16 on the drum surface 14.

Drum 10 is rotated about longitudinal axis 12 by driving apparatus 25 of conventional design and construction.

In accordance with a preferred embodiment of the invention there is provided track apparatus external to drum 10 and preferably comprising a pair of parallel tracks 30 and 32 which are disposed in mutually spaced parallel orientation with respect to axis 12 Preferably at least track 32 is supported on a support member 34 which also rotationally supports drum 10.

Arranged for axial motion along tracks 30 and 32 parallel to the longitudinal axis 12 is mounting apparatus 36, which preferably includes locomotion means such as an electric motor drive (not shown). Mounting apparatus 36 includes a curved support portion 40 which extends transversely to axis 12 and along an arc generally parallel to the cylindrical surface of drum 10 and spaced therefrom.

Mounted on mounting apparatus 36 at support portion 40 are a multiplicity of laser diode writing assemblies 42 which are arranged to direct individual laser beams, normally having a generally elliptical cross section through a slit 44 formed on support portion 40 into impingement with the recording material 16.

Figure 1:
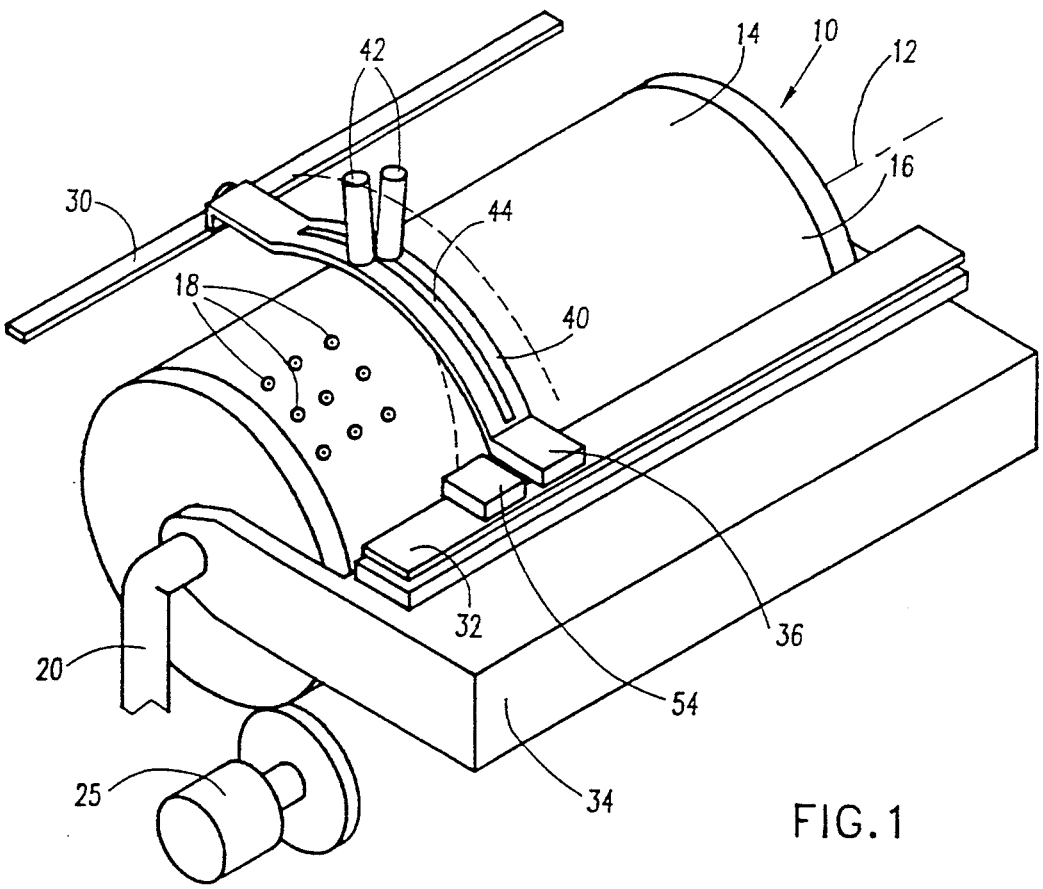
FIG. 1 is a simplified pictorial illustration of a plotter constructed and operative in accordance with a preferred embodiment of the present invention.
Figure 2:
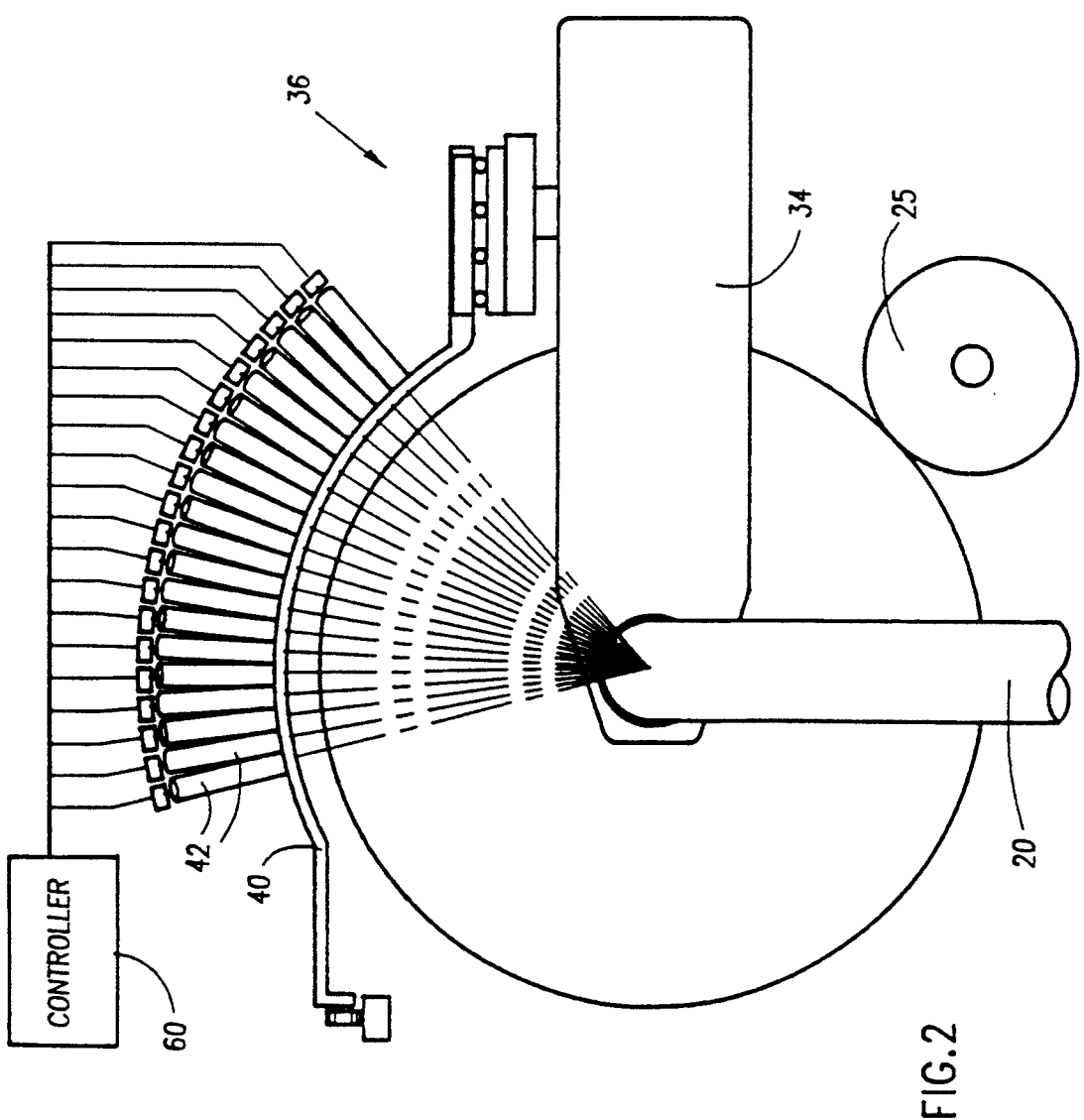
FIG. 2 is a partially block diagram, partially end view illustration of the apparatus of FIG. 1.

As seen particularly in FIGS. 1 and 2, the multiplicity of laser diode writing assemblies 42 are arranged to write along a line and the individual writing assemblies 42 are arranged in a plurality of mutually offset pairs, each pair including a laser diode writing assembly which is oppositely inclined with respect to the other relative to the longitudinal axis 12 such that they all impinge along the same line.

Figure 3:
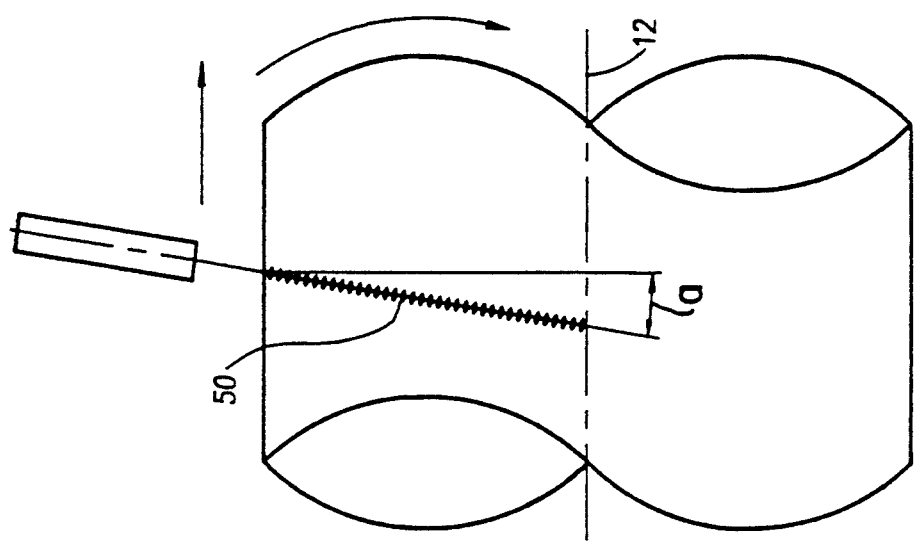
FIG. 3 is an illustration of the line configuration of laser impingements on the cylindrical recording medium produced by the combination rotation and axial relative movement between a laser diode and the recording medium.

It will be appreciated from a consideration of FIG. 3, that writing engagement of the multiplicity of laser diode writing assemblies 42 with the recording material 16 occurs while the recording material rotates and the mounting apparatus moves longitudinally parallel to the longitudinal axis. Under conditions of uniform speeds of rotation and axial motion, a skewed writing line 50 is produced on the recording medium, which is angled from the perpendicular to axis 12 by an angle a, which is equal to the arctangent of the longitudinal velocity and the rotational velocity of the recording material relative to the laser diode writing assemblies.

It is appreciated that an increase in resolution can be achieved by increasing the angle a by varying either or both of the longitudinal and rotational velocities.

In accordance with a preferred embodiment of the present invention, apparatus may be provided for real time verification of writing by the plotter. This may be provided by mounting onto the mounting apparatus 36 a reader 54, such as a CCD camera or any other suitable reader, for longitudinal motion together with the laser diode writing assemblies 42 parallel to axis 12.

Figure 4B:
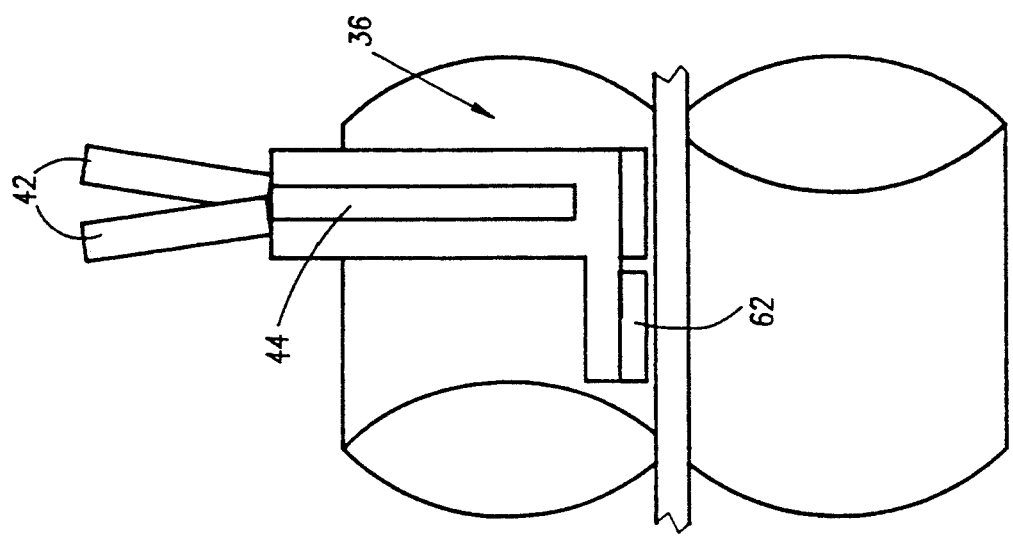
FIGS. 4A and 4B illustrate two alternative configurations of mounting writing and reading apparatus for relative motion with respect to the cylindrical recording medium.
Figure 4A:
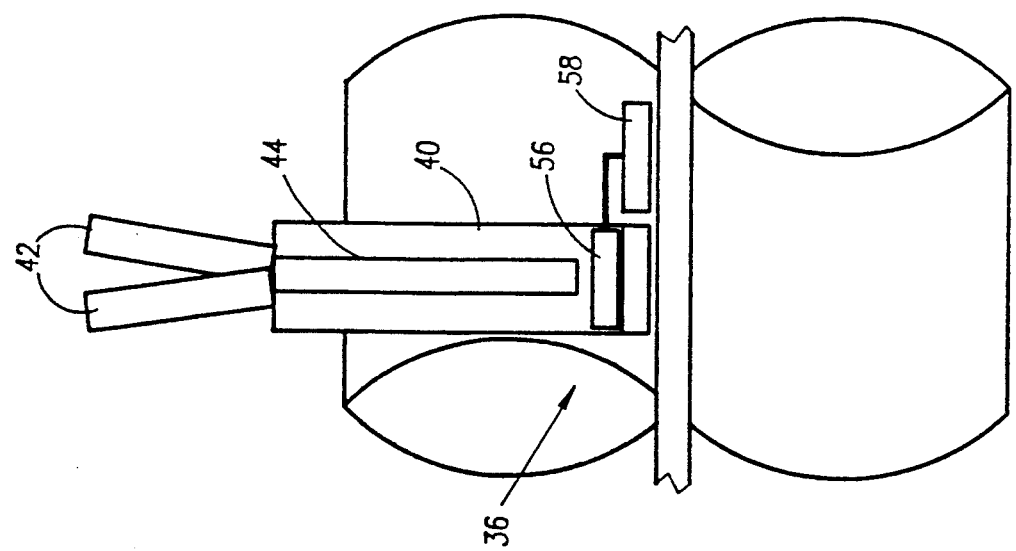

FIGS. 4A and 4B illustrate two alternative arrangements of the reader 54 on the mounting apparatus 36. In the embodiment of FIG. 4A, a sensor 56 is mounted in line with the plurality of laser diode writing assemblies 42 on mounting apparatus 36 and provides a signal output to verification circuitry 58 which in turn communicates with a controller 60 (FIG. 2) which controls the overall operation of the plotter in a conventional manner. The structure of the controller 60 may be entirely conventional and is well within the scope of the skill of a person of ordinary skill in the art. The design and operation of the controller is considered to be outside the scope of the present invention.

Verification circuitry 58 may provide two or more levels of verification, including, for example, a pixel-by-pixel verification of correct writing and a higher level verification utilizing image processing techniques. Using this latter, higher level verification technique, CAD references may be made and design faults may be detected.

In the embodiment of FIG. 4B, an integrated sensor and verification circuit 62 is disposed alongside and "downstream" of the line of laser diode writing assemblies FIG. 5 illustrates, in simplified form, the construction of a laser diode writing assembly 42. A laser diode 70, such as a laser diode manufactured by SDL of California, U.S.A., receives a signal input from controller 60 (FIG. 2) via a via a driver 72. The laser output of laser diode 70 is focussed by a lens 73 onto a location on the recording material 16 (FIG. 1). The laser diode preferably includes an internal sensor which is used for external verification of the laser diode output. The output of the internal sensor is supplied via a pre-amplifier 74 to controller 60.

It will be appreciated by persons skilled in the art that the present invention is not limited by what has been particularly shown and described hereinabove. Rather the scope of the present invention is defined only by the claims which follow:

We claim:

1. External drum plotter apparatus, comprising:
    a generally cylindrical drum having a longitudinal axis of symmetry and a cylindrical support surface disposed about the longitudinal axis, for supporting thereon in generally cylindrical configuration, recording material to be written upon;
    means for rotating the drum about the longitudinal axis;
    longitudinal track means arranged parallel to the longitudinal axis;
    mounting means arranged for longitudinal riding movement on the track means and parallel to the longitudinal axis;
    a multiplicity of laser diode writing assemblies mounted on the mounting means and arranged for writing engagement with the recording material while the recording material rotates and the mounting means moves longitudinally parallel to the longitudinal axis; and
    reading means, mounted on the mounting means for motion therewith relative to the recording material and directed towards the recording material for sensing laser writing on the recording material and for providing verification of correct writing by the multiplicity of laser diode writing assemblies.

2. Apparatus according to claim 1 and wherein said multiplicity of laser diode writing assemblies is arranged for impingement on the recording material in a line configuration.

3. Apparatus according to claim 2 and wherein resolution of writing on the recording medium can be selected by selecting the angle of the line configuration of impingement relative to the longitudinal axis.

4. Apparatus according to claim 3 and wherein said multiplicity of laser diode writing assemblies is arranged in mutually offset pairs, each pair including a laser diode writing assembly which is oppositely inclined with respect to the other relative to the longitudinal axis so that they both impinge along the same line.

5. Apparatus according to claim 2 and also comprising means for interlacing impingement of the multiplicity of laser diode writing assemblies for enhancement of resolution.

6. Apparatus according to claim 2 and wherein said multiplicity of laser diode writing assemblies is arranged in mutually offset pairs, each pair including a laser diode writing assembly which is oppositely inclined with respect to the other relative to the longitudinal axis so that they both impinge along the same line.

7. Apparatus according to claim 1 and wherein resolution of writing on the recording medium can be selected by selecting the angle of the line configuration of impingement relative to the longitudinal axis.

8. Apparatus according to claim 7 and wherein said multiplicity of laser diode writing assemblies is arranged in mutually offset pairs, each pair including a laser diode writing assembly which is oppositely inclined with respect to the other relative to the longitudinal axis so that they both impinge along the same line.

9. Apparatus according to claim 1 and also comprising means for interlacing impingement of the multiplicity of laser diode writing assemblies for enhancement of resolution.

10. Apparatus according to claim 9 and wherein said multiplicity of laser diode writing assemblies is arranged in mutually offset pairs, each pair including a laser diode writing assembly which is oppositely inclined with respect to the other relative to the longitudinal axis so that they both impinge along the same line.

11. Apparatus according to claim 1 and wherein said multiplicity of laser diode writing assemblies is arranged in mutually offset pairs, each pair including a laser diode writing assembly which is oppositely inclined with respect to the other relative to the longitudinal axis so that they both impinge along the same line.

* * * * *